(12) United States Patent
Leder

(10) Patent No.: US 11,467,292 B2
(45) Date of Patent: *Oct. 11, 2022

(54) RADIATION DETECTOR

(71) Applicant: THERMO FISHER SCIENTIFIC MESSTECHNIK GMBH, Erlangen (DE)

(72) Inventor: Erich Leder, Heroldsbach (DE)

(73) Assignee: Thermo Fisher Scientific Messtechnik GmbH, Erlangen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/326,831

(22) Filed: May 21, 2021

(65) Prior Publication Data

US 2021/0278550 A1    Sep. 9, 2021

Related U.S. Application Data

(63) Continuation of application No. 16/660,273, filed on Oct. 22, 2019, now Pat. No. 11,047,993.

(60) Provisional application No. 62/749,223, filed on Oct. 23, 2018.

(51) Int. Cl.
    *G01T 1/202*    (2006.01)
    *G01T 1/02*     (2006.01)

(52) U.S. Cl.
    CPC .................................. *G01T 1/023* (2013.01)

(58) Field of Classification Search
    CPC ....... G01T 1/023; G01T 1/202; G01T 1/2023; G01T 1/203
    See application file for complete search history.

(56) References Cited

U.S. PATENT DOCUMENTS

| 9,645,257 | B2 | 5/2017 | Kusner |
| 2015/0307777 | A1 | 10/2015 | Fukuda et al. |
| 2015/0362600 | A1 | 12/2015 | Perna et al. |

FOREIGN PATENT DOCUMENTS

| KR | 20140022183 A | 2/2014 |
| KR | 101444218 B1 | 10/2014 |
| WO | WO-2013036529 A2 | 3/2013 |
| WO | WO-2015081134 A2 | 6/2015 |

OTHER PUBLICATIONS

Invitation to Pay Additional Fees with Partial Search report dated Jan. 24, 2020, to PCT Application No. PCT/EP2019/078911.
PCT/EP2019/078911, International Preliminary Report on Patentability, dated May 6, 2021, 9 pages.
PCT/EP2019/078911, Search Report and Written Opinion, dated Mar. 16, 2020.

*Primary Examiner* — David P Porta
*Assistant Examiner* — Fani Polyzos Boosalis

(57) ABSTRACT

A radiation detector includes a printed circuit board and a detector assembly operably connected to the printed circuit board. The detector assembly includes a silicon photomultiplier and an organic scintillator coating applied to a surface of the silicon photomultiplier. A reflective foil covers the organic scintillator coating. A light sealing cover is secured to the printed circuit board such that the silicon photomultiplier and the organic scintillator are encapsulated within the light sealing cover.

18 Claims, 6 Drawing Sheets

RADIATION DETECTOR

CROSS-REFERENCE TO RELATED APPLICATIONS

The present application is a continuation of U.S. patent application Ser. No. 16/660,273, filed Oct. 22, 2019, which claims the priority benefit from U.S. Patent Application Ser. No. 62/749,223, filed Oct. 23, 2018, which are hereby incorporated by reference herein in their entirety for all purposes.

FIELD

Aspects of this disclosure relate generally to a radiation detector, and more particularly, to a radiation detector using an organic scintillator coating.

BACKGROUND

Radiation detectors such as those implemented in dosimeters are known for determining radiation levels in hazardous environments, which is useful in helping to protecting users from exposure to such radiation.

Personal Radiation Detectors (PRDs) capable of measuring gamma radiation are known and used to alert users to exposure to dangerous levels of radiation by measuring dose rates with high precision in a wide photon energy range ~50 keV to 3 MeV. However, PRD embodiments may have limitations for measurements of what is generally referred to as "high dose rate" radiation.

Some PRD embodiments utilize pin diode detectors and Geiger-Müller detectors. Geiger-Müller detectors operate at a high voltage of approximately 500 V and require an energy filter. Geiger-Müller detectors cover a wide dose rate range up to 10 Sv/h and offer angular and energy compensation. The tubes of the Geiger-Müller detector are typically glass blown manually and, therefore, have long lead times, fragility, increased cost, and production volume limitations. The manufacturing tolerances involved in the production of such tubes lead to performance variation and quality issues. Additional issues include possible gas leakage from the tubes and damage to the glass tubes themselves.

PRD's generally exploit atomic or molecular excitation produced by radiation passing through a scintillation material. Subsequent de-excitation generates photons of light that can be measured to give an indication of the energy deposited in the detector by the radiation. For example, a detector may include scintillation material coupled to a photomultiplier. When the detector is exposed to radiation, the scintillation material is excited, generating photons of visible light. This light then strikes the photomultiplier, which amplifies the result and generates a signal that can be measured.

It would be desirable to provide a PRD that reduces or overcomes some or all of the difficulties inherent in prior known devices. Particular objects and advantages will be apparent to those skilled in the art, that is, those who are knowledgeable or experienced in this field of technology, in view of the following disclosure and detailed description of certain embodiments.

SUMMARY

In accordance with a first aspect, a radiation detector includes a printed circuit board and a detector assembly operably connected to the printed circuit board. The detector assembly includes a silicon photomultiplier and an organic scintillator coating applied to a surface of the silicon photomultiplier. A reflective foil covers the organic scintillator coating. A light sealing cover is secured to the printed circuit board such that the silicon photomultiplier and the organic scintillator are encapsulated within the light sealing cover.

In accordance with another aspect, a method of manufacturing a radiation detector includes combining a doped polyvinyl toluene organic scintillator and a solvent in a pipette, dispensing the dissolved polyvinyl toluene organic scintillator and solvent onto a surface of a detector assembly including a photomultiplier positioned on a printed circuit board, heating the detector assembly in a vacuum oven such that the solvent evaporates, coating the detector assembly with at least one layer of varnish, and applying an optical reflector on the scintillator.

Such detectors can be used in dosimetry applications and in devices for first responders (analysis in accident cases) or ambient dose equivalent probes.

These and additional features and advantages disclosed here will be further understood from the following detailed disclosure of certain embodiments, the drawings thereof, and from the claims.

BRIEF DESCRIPTION OF THE DRAWINGS

The foregoing and other features and advantages of the present embodiments will be more fully understood from the following detailed description of illustrative embodiments taken in conjunction with the accompanying drawings in which.

Figure 1:
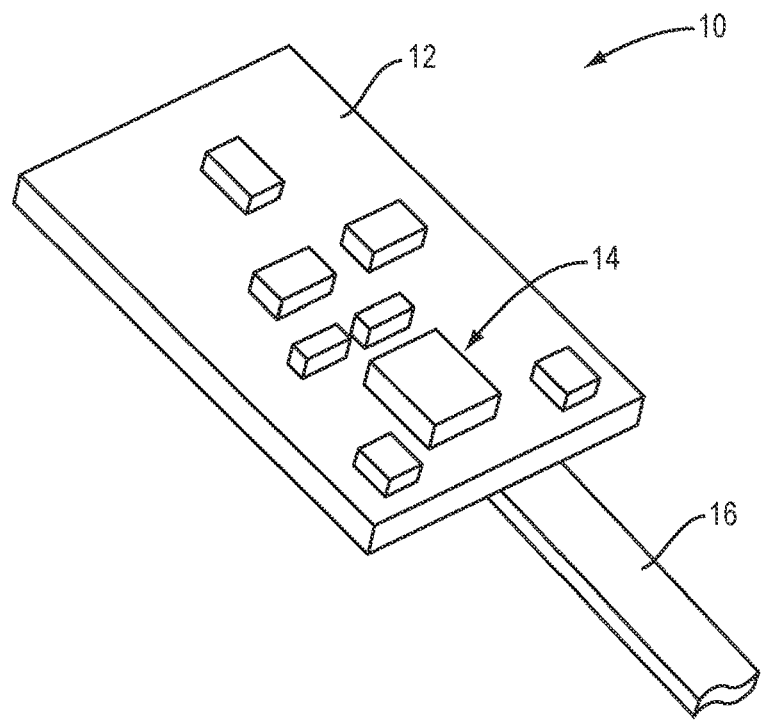
FIG. 1 is a schematic top view of a radiation detector.
Figure 2:
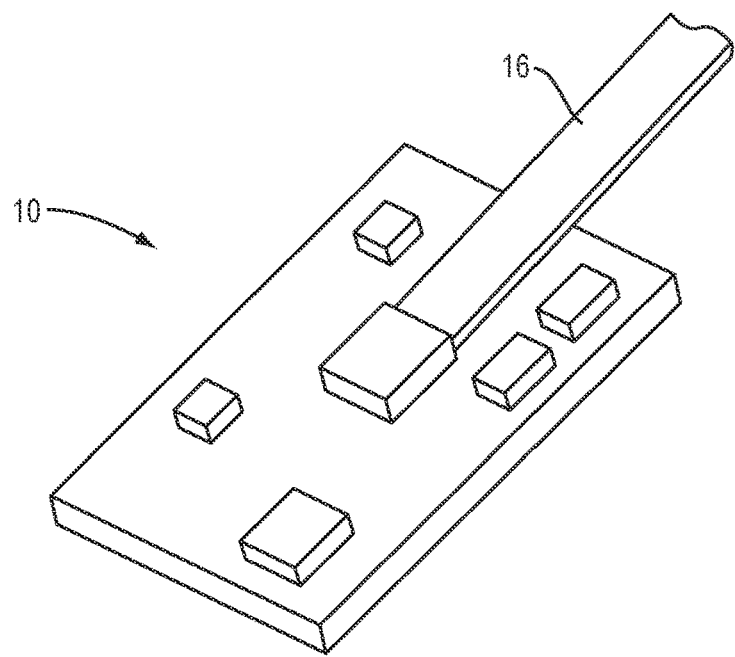
FIG. 2 is a schematic bottom view of the radiation detector of FIG. 1.

The figures referred to above are not drawn necessarily to scale, should be understood to provide a representation of particular embodiments, and are merely conceptual in nature and illustrative of the principles involved. Some features of the radiation detector depicted in the drawings have been enlarged or distorted relative to others to facilitate explanation and understanding. The same reference numbers are used in the drawings for similar or identical components and features shown in various alternative embodiments. Radiation detectors as disclosed herein would have configurations and components determined, in part, by the intended application and environment in which they are used.

DETAILED DESCRIPTION OF EMBODIMENTS

In the following description of various example structures in accordance with the disclosure, reference is made to the accompanying drawings, which form a part hereof, and in which are shown by way of illustration of various structures in accordance with the disclosure. Additionally, it is to be understood that other specific arrangements of parts and structures may be utilized, and structural and functional modifications may be made without departing from the scope of the present disclosure. Also, while spatial terms such as "top" and "bottom" and the like may be used in this specification to describe various example features and elements of the disclosure, these terms are used herein as a matter of convenience, e.g., based on the example orientations shown in the figures and/or the orientations in typical use. Nothing in this specification should be construed as requiring a specific three dimensional or spatial orientation of structures in order to fall within the scope of this disclosure.

Referring to FIG. 1, a radiation detector 10 includes a printed circuit board 12. Printed circuit board 12 may house various electronic components including, for example, a temperature sensor, a microcontroller, an amplifier, a bias generator, and comparators. Other suitable components for printed circuit board 12 will become readily apparent to those of skill in the art, given the benefit of this disclosure.

A detector assembly 14 is operably connected to printed circuit board 12 in known fashion. Printed circuit board 12 includes a cable 16, which may be a flat cable, for example, that serves to provide power and data transmission to and from printed circuit board 12. Cable 16 may provide digital data communication with printed circuit board 12 via UART, SPI, or I2C, for example. In some alternate embodiments, cable 16 may in fact be a board-to-board connector of known construction.

Figure 3:
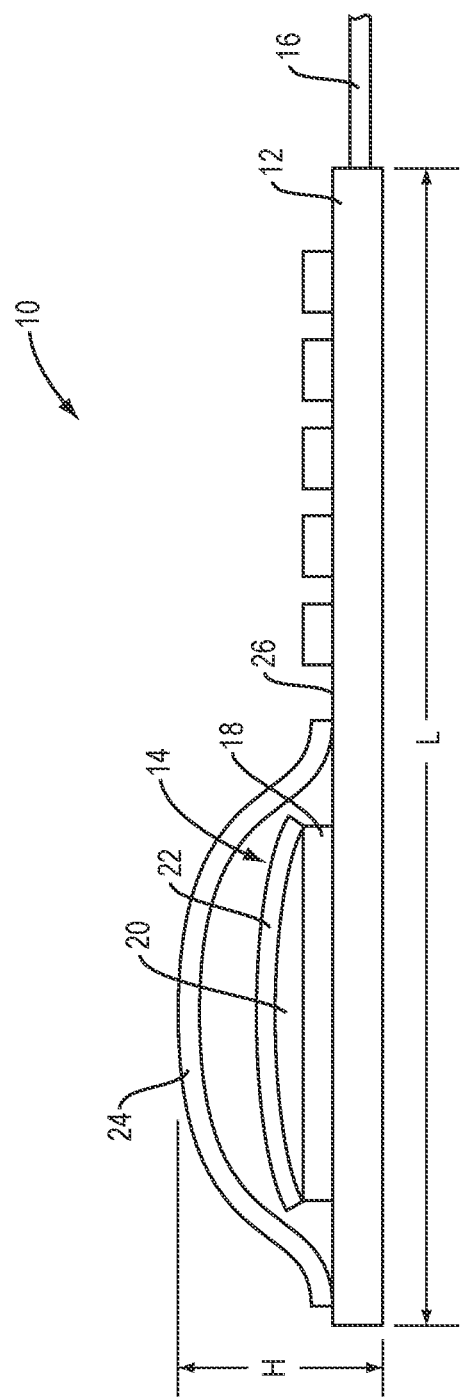
FIG. 3 is an elevation view, partially broken away, of the radiation detector of FIG. 1.

As shown in FIG. 3, detector assembly 14 includes a photomultiplier 18 that is on and operably connected to printed circuit board 12. In certain embodiments, photomultiplier 18 may be a Silicon (Si) photomultiplier.

Scintillator 20 sensitive to gamma and/or beta radiation in the form of a coating is directly applied to an upper surface of photomultiplier 18. In certain embodiments, scintillator 20 comprises an organic scintillator material applied as a coating, such as for example a coating of doped polyvinyl toluene (PVT). Exemplary doped PVT products include BC-400 and BC-404 provided by Saint-Gobain Crystals of Hiram, Ohio; and EJ-296 provided by Eljen Technology of Sweetwater, Tex. It is to be appreciated that scintillator 20 may also contain xylene.

Optical reflector 22 is positioned on scintillator 20 and serves to prevent light from being transmitted anywhere other than toward photomultiplier 18. Thus, optical reflector 22 reflects light leaving scintillator 20 back toward photomultiplier 18. Additionally, optical reflector 22 may create additional electrons, thereby improving the performance of detector 10. Optical reflector 22 may be formed of a thin reflective metal foil, such as an aluminum sputtered mylar, for example. Optical reflector 22 may also be a metal-free film such as a polymeric film. An exemplary polymeric film is DF200MA available from 3M of St. Paul, Minn. In certain embodiments, optical reflector 22 may have a thickness between approximately 20 µm and approximately 250 µm.

Due to the light sensitivity of photomultiplier 18, the region around photomultiplier 18 is light sealed to prevent ambient light from affecting the performance of detector 10. A light sealing cover 24 is secured to an upper surface 26 of printed circuit board 12 about a periphery of detector assembly 14. It is to be appreciated that in certain embodiments light sealing cover 24 can be secured to printed circuit board 12 in such a manner so as to completely cover the entirety of printed circuit board 12. However, in some embodiments light sealing cover 24 may include a thin "entry window" constructed from metalized mylar, thin metal foil, or other similar materials such as those of optical reflector 22, where the entry window also has a dimension and orientation to enable gamma and beta radiation to pass. Light sealing cover 24 may be formed of black tape, aluminum tape, or copper tape, for example.

In certain embodiments, photomultiplier 18 has a width of approximately 3 mm and a depth of approximately 3 mm. The surface area of photomultiplier 18 can be increased to achieve more detector sensitivity or the surface area can be decreased to approximately 1 mm$^2$ to provide for more compact detector assemblies. Detector assembly 14 may have a height H of between approximately 2 mm and approximately 5 mm, a length L of between approximately 10 mm and approximately 25 mm, and a depth D (not shown here) of between approximately 10 mm and approximately 25 mm. Thus, such a detector assembly provides a compact form factor that can be adapted to a personal wearable device.

Figure 4:
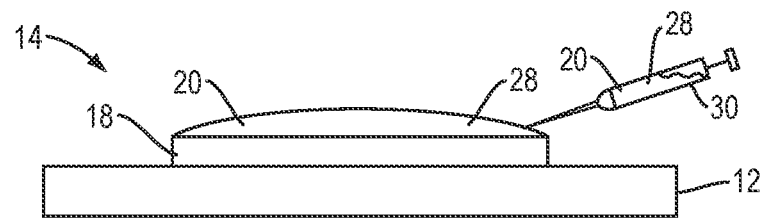
FIG. 4 is an elevation view of a detector assembly of the radiation detector of FIG. 1, shown with a pipette dispensing an organic scintillator and solvent onto a photomultiplier.

A process used to produce detector assembly 14 will now be described in conjunction with FIGS. 4-6. As shown in FIG. 4, an organic scintillator material for forming scintillator 20 is combined with a solvent 28 in a pipette 30. In certain embodiments the solvent may be xylene, for example. The combined organic scintillator material for forming scintillator 20 and solvent 28 is then dispensed from pipette 30 onto the surface of photomultiplier 18.

Figure 5:
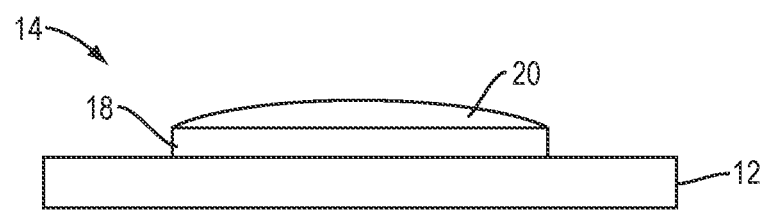
FIG. 5 is an elevation view of the detector assembly of FIG. 4, shown after the solvent has evaporated and the organic scintillator has cured.
Figure 6:
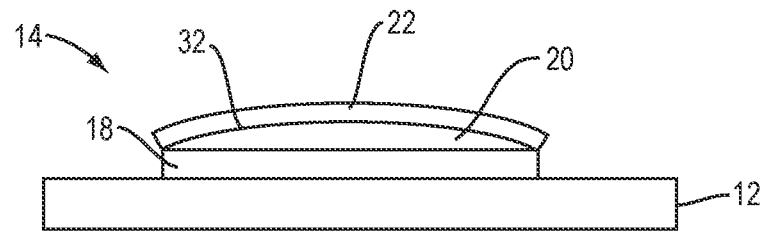
FIG. 6 is an elevation view of the detector assembly of FIG. 4, shown with an optical reflector secured to the scintillator.

The detector assembly 14 is then heated in a vacuum oven (not shown), where the solvent will evaporate and scintillator 20 will cure on photomultiplier 18, as shown in FIG. 5. In certain embodiments, detector assembly 14 is heated to approximately 50° C. It is to be appreciated that in certain embodiments, detector assembly 14 may not be heated in a vacuum oven, and may be dried at room temperature. It will be appreciated by those skilled in the art, that the shrinkage of scintillator 20 during the curing cycle will be accounted for to match the desired thickness.

The thickness of scintillator 20 can be varied by coating the surface of photomultiplier 18 multiple times. By varying the thickness of scintillator 20 placed on photomultiplier 18, the sensitivity of detector 10 can be varied. In certain embodiments, scintillator 20 may have a thickness between approximately 50 µm and approximately 1000 µm.

A layer of varnish 32 may then be applied to the surface of scintillator 20, and optical reflector 22 is then placed on the layer of varnish 32, which helps optical reflector 22 to adhere to scintillator 20. It will be appreciated by those skilled in the art, that the adhesion of optical reflector 22 and scintillator 20 should be free of air gaps or other inconsistencies to prevent uniformity differences.

Figure 7:
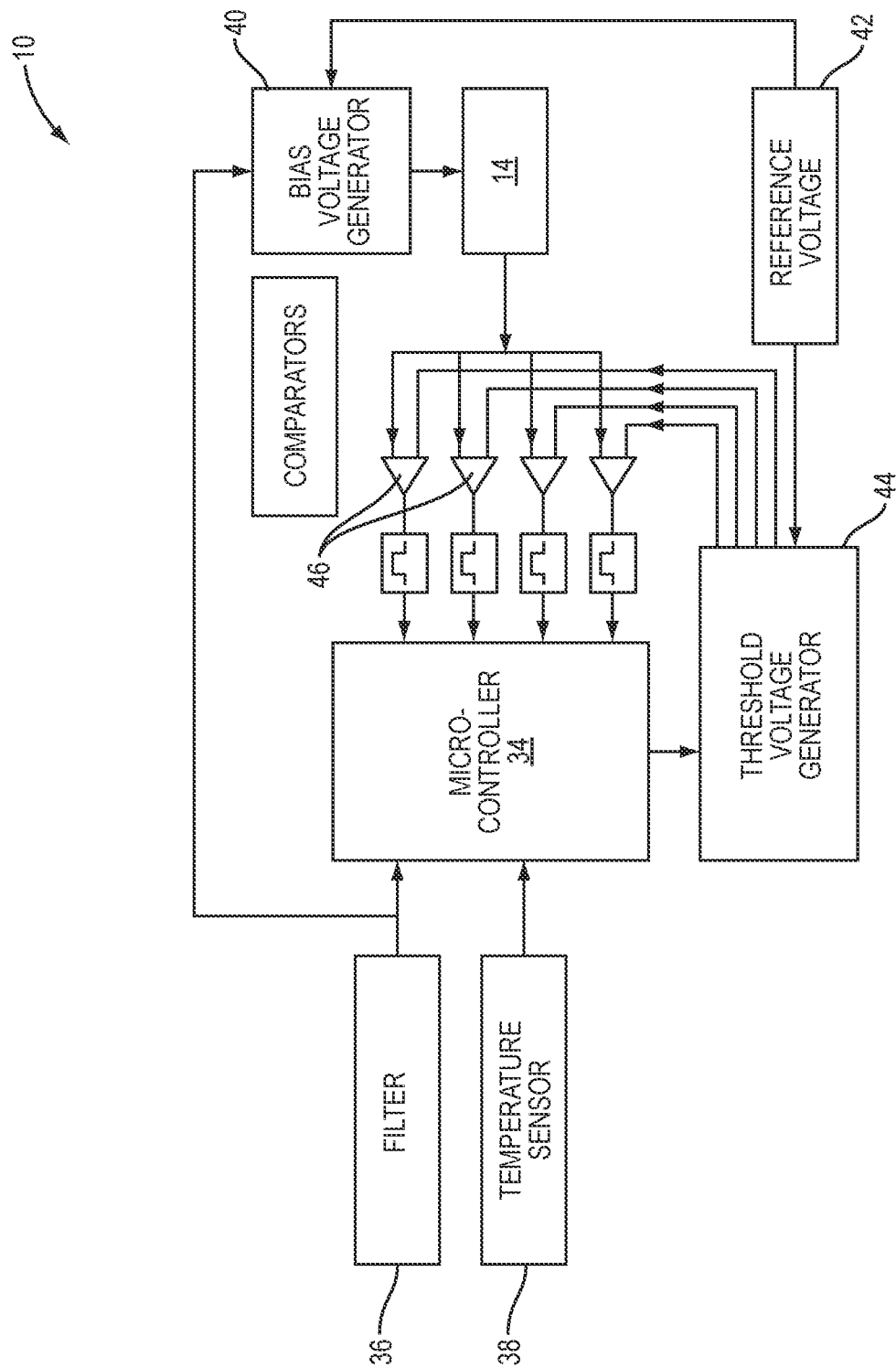
FIG. 7 is a schematic view of the interaction of components of the printed circuit board of the radiation detector of FIG. 1 to produce dosage measurements.

Radiation detector 10 works in known fashion to provide light scintillation that can be detected as light pulses from scintillator 20 in response to gamma and/or beta radiation, which are converted into electrical signals by photomultiplier 18, as illustrated in FIG. 7. FIG. 7 only illustrates a single implementation of detector assembly 14, however those of ordinary skill in the art will appreciate that detector 10 may include multiple implementations of detector assembly 14 that may be useful for some applications such as the detection of beta radiation. This detection effect may be supplemented by the additional electrons produced by photomultiplier 18 in response to pulses of light reflected by optical reflector 22.

Detector 10 is controlled by a microcontroller 34 positioned on printed circuit board 12 (not shown here). Detector 10 may also include capacitive filter 36 to suppress electromagnetic interference and electrostatic discharge. As noted above, detector 10 may include a temperature sensor 38. A 32 V bias voltage generator 40 provides a voltage to detector assembly 14, and a reference voltage 42 for a threshold voltage generator 44. Threshold voltage generator 44 may have four channels to provide four reference signals.

Comparators 46 are then used to compare the reference signals from threshold voltage generator 44 with the signals from the four channels from detector assembly 14, and the pulse shapes of the signals are compared to generate the signals based on the gamma rays detected.

Figure 8:
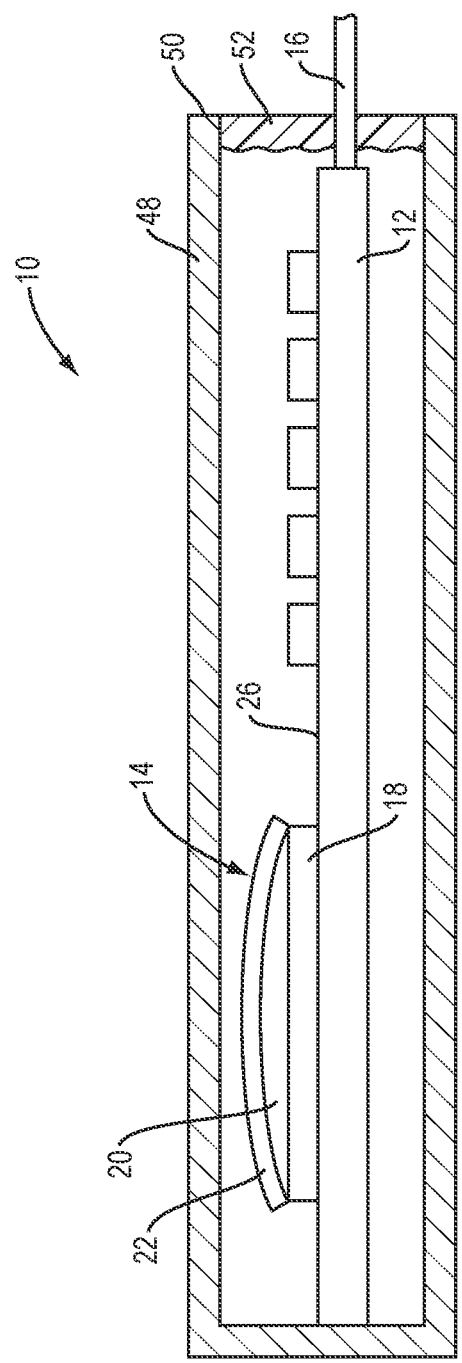
FIG. 8 is an elevation view, partially broken away, of an alternative embodiment of the radiation detector of FIG. 1.

Another embodiment of detector 10 is shown in FIG. 8. In this embodiment, the light sealing is not provided by a light sealing cover 24 around detector assembly 14. In this embodiment, a light sealing container or canister 48 surrounds detector 10. In certain embodiments, container 48 may be formed of metal, such as aluminum, for example which has an open end to allow container 48 to slide over the assembly. An open end 50 of container 48 is closed with a sealant 52 that encases and surrounds cable 16 as it exits open end 50 of container 48. Sealant 52 may be black silicone, for example. In some embodiments, sealant 52 is a room temperature vulcanizing (RTV) silicone.

Thus, the entirety of detector 10 is encased within container 48, thereby preventing ambient light from affecting the performance of detector 10. Container 48 may also be constructed to filter beta radiation, which can also be detected by detector assembly 14, as well as provide electromagnetic interference (EMI) shielding. Some embodiments may also include an energy filter constructed of plastic (e.g. 2-3 mm thick) that filters beta radiation. However, as with sealing cover 24, some embodiments of container 48 may include the thin entry window constructed suitable material and with a dimension and orientation to enable gamma and/or beta radiation to pass.

Figure 9:
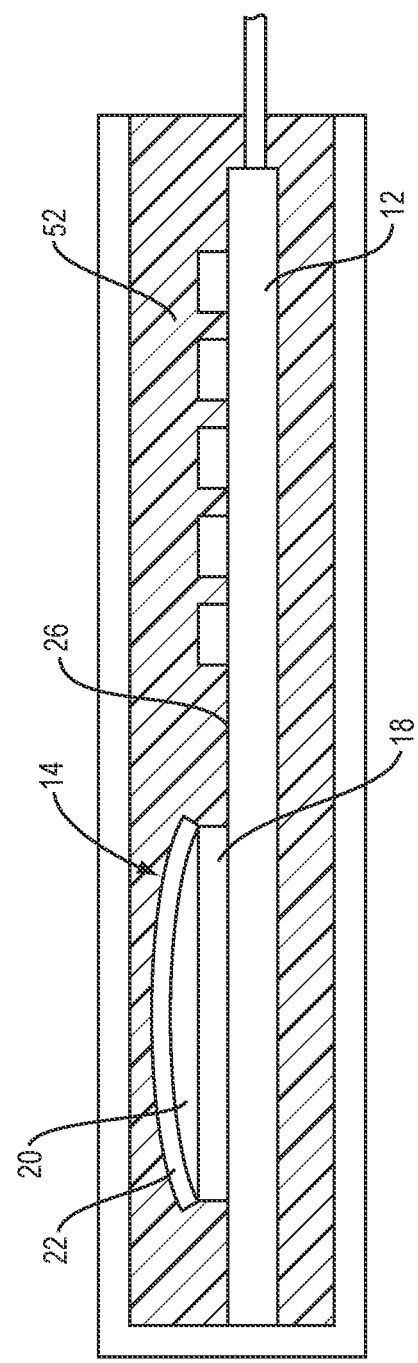
FIG. 9 is an elevation view, partially broken away, of an alternative embodiment of the radiation detector of FIG. 1.

Another embodiment is shown in FIG. 9. Like the embodiment of FIG. 8, a light sealing container or canister 48 surrounds detector 10. After detector 10 is positioned inside container 48 sealant 52 is inserted into container 48 to completely encase detector 10 within sealant 52. Sealant 52 may be black silicone, such as a room temperature vulcanizing (RTV) silicone, or an epoxy.

Radiation detectors 10 as disclosed herein provide a dosimeter that is compact in size and weight, can be manufactured in an efficient and cost-effective manner, and can be used for high gamma dose rates up to about 30 Sv/h. Additionally, radiation detector 10 has a low maximum voltage, thereby providing a dosimeter that is safer than those with high voltages. In certain embodiments, radiation detector 10 has a maximum voltage of approximately 34 V, which is significantly less than a typical Geiger-Müller tube detector of the prior art. With a maximum voltage of approximately 34V, radiation detector 10 can be compliant with UL913 and similar safety standards, which is not possible with the 500 V supply voltage of Geiger-Müller tubes. Detector 10 also does not require a high precision metal energy filter.

Those having skill in the art, with the knowledge gained from the present disclosure, will recognize that various changes can be made to the disclosed apparatuses and methods in attaining these and other advantages, without departing from the scope of the present disclosure. As such, it should be understood that the features described herein are susceptible to modification, alteration, changes, or substitution. For example, it is expressly intended that all combinations of those elements and/or steps which perform substantially the same function, in substantially the same way, to achieve the same results are within the scope of the embodiments described herein. Substitutions of elements from one described embodiment to another are also fully intended and contemplated. The specific embodiments illustrated and described herein are for illustrative purposes only, and not limiting of that which is set forth in the appended claims. Other embodiments will be evident to those of skill in the art. It should be understood that the foregoing description is provided for clarity only and is merely exemplary. The spirit and scope of the present disclosure is not limited to the above examples, but is encompassed by the following claims. All publications and patent applications cited above are incorporated by reference in their entirety for all purposes to the same extent as if each individual publication or patent application were specifically and individually indicated to be so incorporated by reference.

What is claimed is:

1. A radiation detector comprising:
   a printed circuit board; and
   a detector assembly operably connected to the printed circuit board and comprising:
   a silicon photomultiplier;
   an organic scintillator coating applied to a surface of the silicon photomultiplier;
   at least one layer of varnish on a surface of the scintillator;
   a reflective foil covering the varnish and organic scintillator coating, wherein the reflective foil, the varnish, and the organic scintillator are adhered together without an air gap; and
   a light sealing cover secured to an upper surface of the printed circuit board about a periphery of the detector assembly.

2. The radiation detector of claim 1, wherein the organic scintillator coating is formed of doped polyvinyl toluene.

3. The radiation detector of claim 1, further comprising a cable operably connected to the printed circuit board and configured to supply power to the printed circuit board and provide digital data communication with the printed circuit board.

4. The radiation detector of claim 1, wherein the light sealing cover is formed of black tape, aluminum tape, or copper tape.

5. The radiation detector of claim 1, wherein the light sealing cover completely covers the entirety of the upper surface of the printed circuit board.

6. The radiation detector of claim 1, further comprising a temperature sensor on the printed circuit board.

7. The radiation detector of claim 1, further comprising a bias voltage generator on the printed circuit board.

8. The radiation detector of claim 1, further comprising a plurality of comparators on the printed circuit board.

9. The radiation detector of claim 1, further comprising a microcontroller on the printed circuit board.

10. The radiation detector of claim 1, further comprising a capacitive filter on the printed circuit board.

11. A method of manufacturing a radiation detector comprising the steps of:
    combining an organic scintillator and a solvent in a pipette;
    dispensing the organic scintillator and solvent onto a surface of a silicon photomultiplier positioned on a printed circuit board;
    drying the organic scintillator and silicon photomultiplier on the printed circuit board such that the solvent evaporates;

coating a surface of the organic scintillator with at least one layer of varnish; and applying an optical reflector on the organic scintillator, wherein the reflective foil, the varnish, and the organic scintillator are adhered together without an air gap.

12. The method of claim 11, wherein the organic scintillator is doped polyvinyl toluene.

13. The method of claim 11, wherein the solvent is xylene.

14. The method of claim 11, wherein the optical reflector is a reflective foil.

15. The method of claim 11, wherein the optical reflector is a metal-free film.

16. The method of claim 11, wherein the optical reflector is a polymeric film.

17. The method of claim 11, wherein the silicon photomultiplier on the printed circuit board is dried at room temperature.

18. The method of claim 11, wherein the organic scintillator on the photomultiplier has a thickness between approximately 50 µm and approximately 1000 µm.

* * * * *